United States Patent Office 3,098,719
Patented July 23, 1963

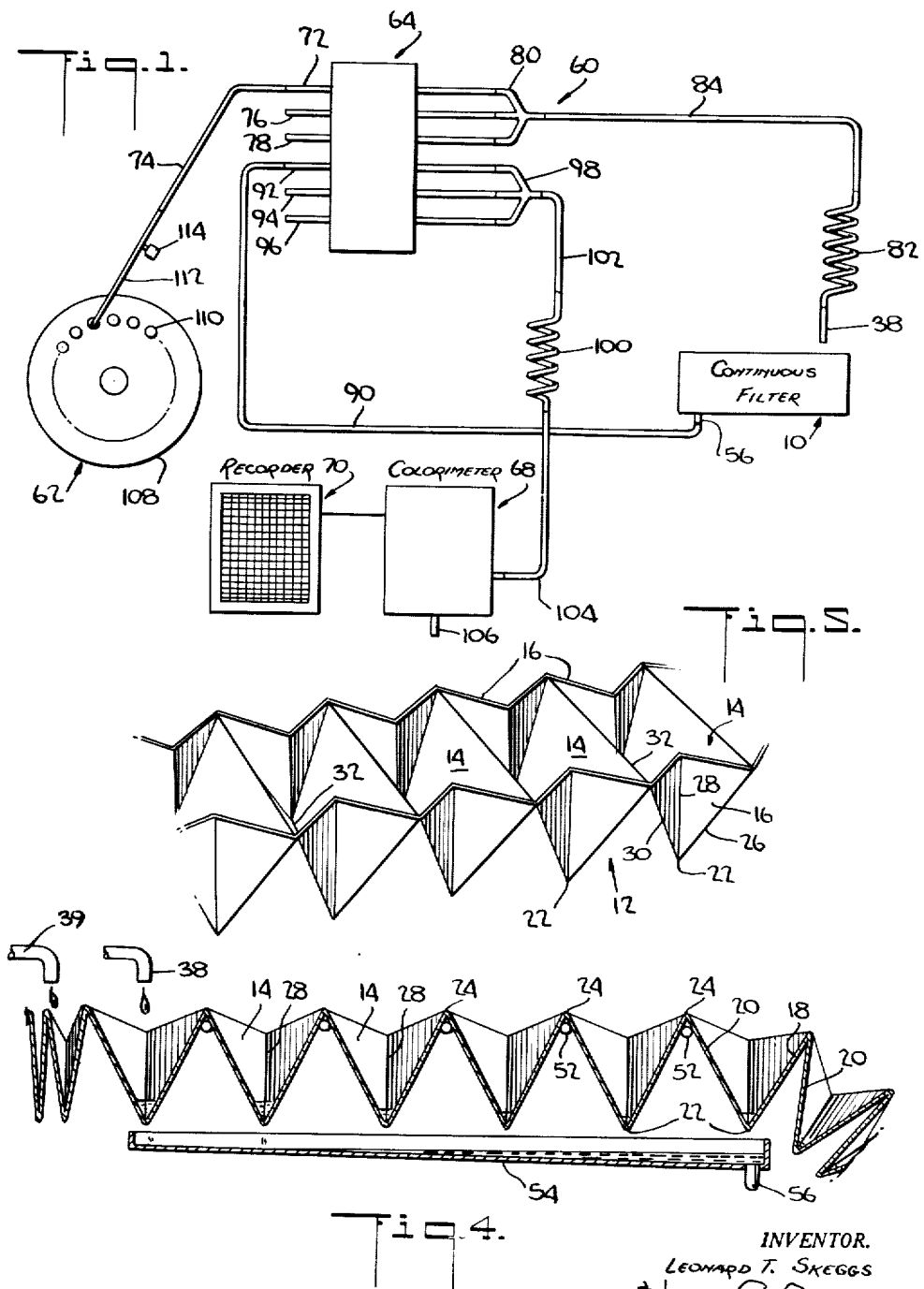

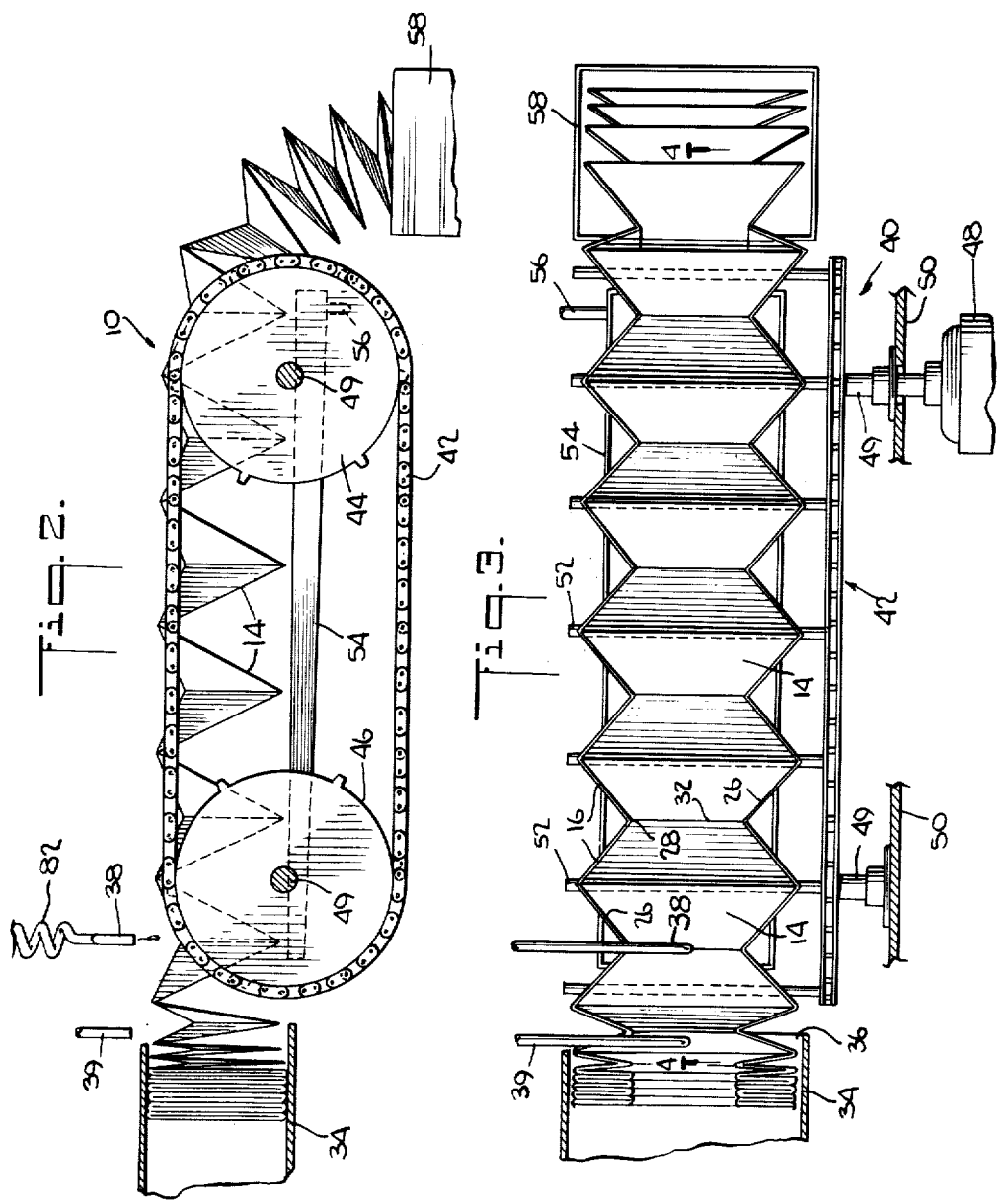

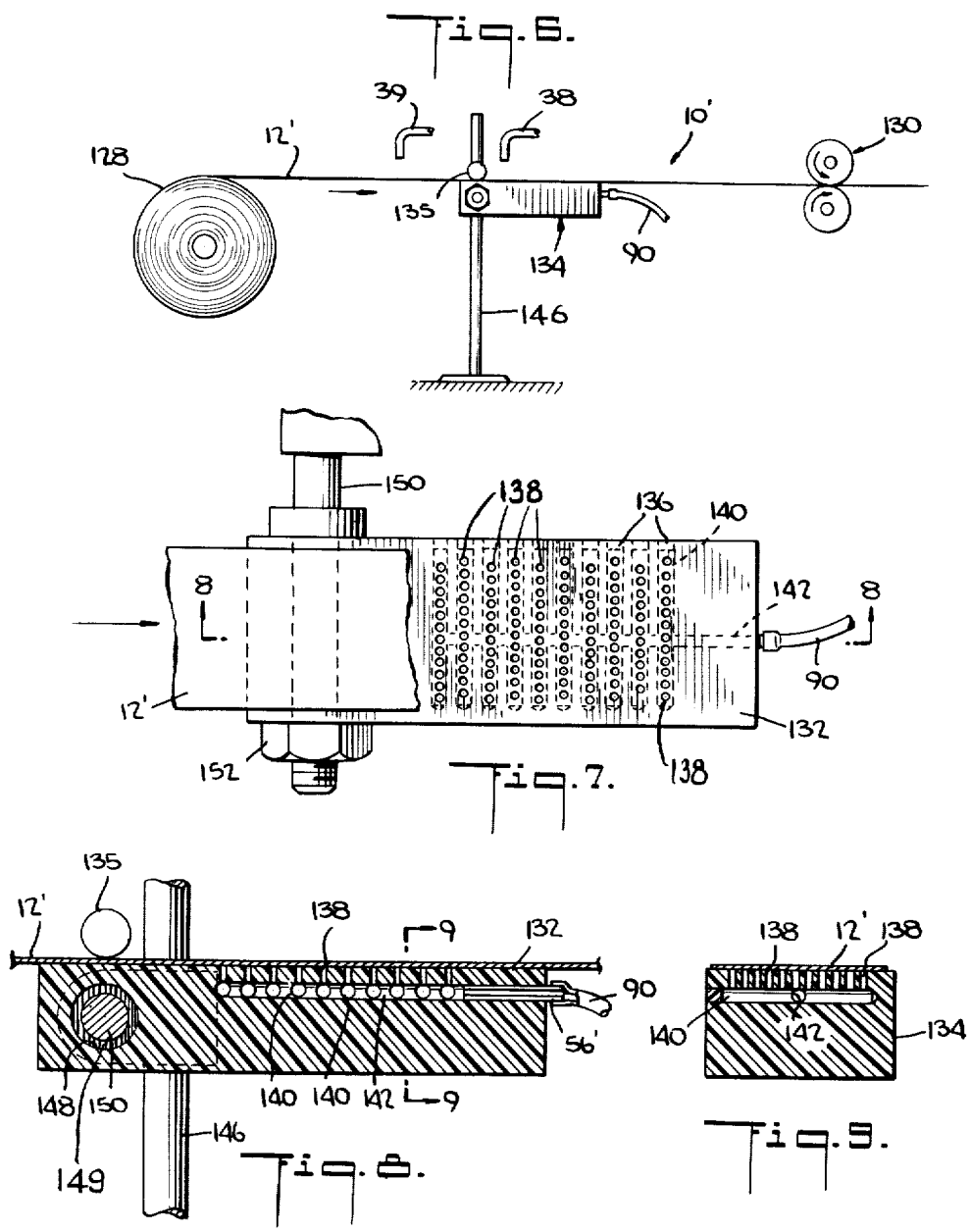

---

3,098,719
FLUID PROCESSING SYSTEM WITH CONTINUOUS FILTER APPARATUS
Leonard T. Skeggs, Cleveland, Ohio, assignor to Technicon Instruments Corporation, Chauncey, N.Y., a corporation of New York
Filed June 16, 1960, Ser. No. 36,583
9 Claims. (Cl. 23—253)

This invention relates to fluid analysis or other processing systems of the type in which a stream of fluid is passed through a continuous operable filter for removing particular material which may be present in the fluid stream.

One object of the present invention is to provide a system or apparatus of the above indicated type with a continuously operable filter for removing particular matter from a fluid stream during the flow thereof, for example, but without limitation, mycelia from fermentation broths, flocculate from phosphoric acid or other streams in the recovery of phosphates from phosphate rocks, etc. This object of the invention is applicable to a fluid stream which is being treated continuously for monitoring, analysis, processing, etc. with respect to an ingredient of the fluid stream and is also applicable to a fluid stream consisting of a series of liquid samples in an analysis apparatus of the type shown in my U.S. Patent No. 2,767,149.

Another object of the present invention is to provide a system of the above indicated type with a continuously operable filter for extracting a particular ingredient from each of a series of liquid samples which flow in the form of a stream from a supply of such samples and are treated to produce a precipitate in each sample and provide a filtrate which contains the particular ingredient. This object of the invention is also applicable to a liquid specimen stream which is treated continuously for monitoring, analysis, extraction or other purposes.

A further object of the invention is to provide a continuously operable filter which is especially advantageous for extracting a substance from a liquid which requires treatment which results in the formation of a precipitate of a soft or gelatinous or other consistency which would seriously hamper or prevent extraction by dialysis or other separation of the substance from such precipitate. For example, but without limitation, the filter apparatus of the present invention is advantageous for the quantitative analysis of blood serum in respect to its cholesterol content, involving the well known method of treating the serum with the precipitant isopropyl alcohol to precipitate the proteins, the resulting mixture being filtered to obtain a filtrate which contains the cholesterol free of proteins or other solid materials which would interfere with the analysis.

Another important object is the provision of filter apparatus which is operable automatically to present a series of clean filter material surfaces in succession to a filtering station at which a liquid is supplied in the form of a stream for the filtering of successive portions of the liquid stream.

A further object is to provide a filter apparatus which is operable automatically to present the filter material to the filtering station and thereafter to a station at which the filter material is discarded or otherwise treated, for example, cleaned for re-use.

Another object is generally to provide an improved continuously movable filter.

The above and other objects, features and advantages of this invention will be fully understood from the following description of the presently preferred embodiments of the invention considered in connection with the accompanying drawings which are to be considered as illustrative of the invention but not in limitation thereof.

In the drawings:

FIG. 1 is a diagrammatic view of a fluid processing system or apparatus in accordance with the present invention.

FIG. 2 is a side elevational view, on an enlarged scale, of a continuous filter apparatus of the gravity-feed type in accordance with the invention;

FIG. 3 is a top plan view of the filter apparatus of FIG. 2;

FIG. 4 is a vertical sectional view taken on the line 4—4 of FIG. 3;

FIG. 5 is a perspective view of part of the filter of FIGS. 2 and 3;

FIG. 6 is a side elevational view of a vacuum type filter apparatus in accordance with the invention;

FIG. 7 is a top plan view of part of the filter apparatus shown in FIG. 6, on a larger scale;

FIG. 8 is a sectional view taken on line 8—8 of FIG. 7; and

FIG. 9 is a sectional view taken on line 9—9 of FIG. 8.

Referring to the drawings in detail and first to FIGS. 2 to 5, the continuous filter apparatus 10 of the present invention comprises a continuous strip or web 12 of a suitable filter material, for example filter paper, which is folded into a plurality of filter cups or elements 14 which are disposed in end-to-end relation lengthwise of the strip. The filter cups are open at the top and are V-shaped in transverse cross section, as best seen in FIG. 4. Each cup includes inwardly folded side walls 16 and inclined front and rear walls 18 and 20, respectively, which join at the apex 22 of each filter cup and are in integral one piece relation with the side walls. As here shown, each filter cup is preferably integral with the adjacent cup at connection 24 where the front wall 18 of a cup join the rear wall 20 of a succeeding cup of a series of cups.

To form the continuous strip of filter cups just described, the strip 12 of filter material is folded into a series of squares extending lengthwise of the strip so that the squares, in side elevational view, constitute the legs of alternately inverted V's, as best seen in FIG. 4. The sides 16 of each square are then folded in toward each other along fold lines 26, 28 and 30, and each square is folded along fold line 32 to form the open top filter cups 14 which are expandable and collapsible into open and closed positions. In the collapsed or closed condition of the filter cups 14, filter strip 12 forms a very compact bundle of filter cups which occupy a relatively small spaced in the filtering apparatus 10.

A rectangular shaped hopper or supply bin 34 is provided at one end of the filter apparatus and has an opening 36 which provides an exit through which the filter cups move in succession to receive liquid which is to be filtered. The filter cups are disposed in the hopper in collapsed condition in adjacent side-by-side relation. The exit 36 of the hopper is positioned adjacent a liquid supply or outlet of a conduit 38 at a liquid supply station of the fluid processing apparatus so that as successive filter cups 14 are drawn from the hopper their opened tops are positioned below said liquid supply tube 38 to receive liquid issuing therefrom. A liquid supply outlet 39 is provided ahead of the liquid outlet 38 and supplies water or other suitable clean liquid to pre-wet each of the filter cups 14 before the cups arrive at the liquid supply station to receive the liquid which is to be filtered. This pre-wetting action eliminates the necessity or greatly reduces absorption by the filter material of the liquid which is to be filtered. This is important more especially where the quantities of liquid available for analysis or other processing are small, for example in the analysis of blood or blood serum and in other clinical or laboratory processes.

A continuous conveyor mechanism 40 provides means for withdrawing successive filter cups from the hopper and for opening or expanding each cup into liquid receiving condition during the withdrawal thereof from the hopper. Conveyor mechanism 40 comprises an endless sprocket chain 42 and sprockets 44 and 46 disposed laterally of the moving filter cups. The chain is driven by the sprocket 44 which is actuated by an electric motor 48. The supports for the rotary sprocket shafts 49 are indicated at 50 in FIG. 3. A plurality of rods 52 are spaced along the length of chain 42 and extend laterally of said chain in underlying relation to the filter cups at their connections 24 so that during the movement of the sprocket chain each rod, as it is carried into position at opening 36 of the hopper, withdraws a filter cup from said hopper and carries it longitudinally past liquid supply tube 38. It will be apparent that during this withdrawing operation the filter cup expands into open position to receive the liquid from tube 38. Each rod is suitably secured to a link of the chain and the distance between adjacent rods is such as to expand and open each filter cup into the position shown.

An open top receptacle or trough 54 extends longitudinally of the path of movement of the filter cups and is disposed below the filter cups in position to receive filtrate therefrom. The bottom of the trough is slightly inclined, as shown, to permit ready flow of the filtrate to the liquid outlet 56 which is provided at the far end of the trough. Adjacent this end there is provided a bin 58 which receives the filter cups 14 for disposal or otherwise after the completion of the filtering operation. It will be apparent that new filter cups are continuously being positioned to receive sample liquid from tube 38.

The rate of movement of sprocket chain 42 may be adjusted so that a series of filter cups 14 is provided to receive portions of each liquid sample issuing from tube 38. In the case where the stream of liquid issuing from outlet 38 consists of a series of liquid samples separated by intervening segments of processing liquid or reagent, as will be hereinafter explained with reference to FIG. 1, it is necessary to avoid dilution of the liquid sample by the processing liquid. This is accomplished by operating the sprocket chain 42 at a sufficient speed to assure that each sample in the stream is deposited into a series of cups so that a plurality of cups, each containing a portion of the sample, is provided between the series of cups which receive the segments of processing liquid which are in the stream and are adjacent to the liquid samples, respectively. In this manner a filter cup, which may be below outlet 38 and in such a position so as to receive part of the sample and part of the processing liquid and thus contain diluted sample, does not have any adverse effects on the analysis of a particular sample because there are other cups in the series which contain undiluted portions of the sample for analysis.

In addition, to prevent contamination of a sample by a previous sample due to particles of the previous sample adhering to the walls of the supply tube 38 and the trough 54, the intervening segments of processing liquid provide a wash liquid between successive samples. Also, to prevent contamination of the filtrate of one sample by the filtrate of a preceding sample, the walls of the trough 54 may be lined or coated with a material of low surface tension to provide a non-wetting surface which prevents particles of sample liquid from adhering to the walls of the trough. Any suitable non-wetting material may be used, for example, polytetrafluorethylene, polyethylene, etc.

Referring now to FIG. 1, there is shown a fluid processing system or apparatus 60 which includes a continuous filter, preferably a filter of the construction illustrated by FIGS. 2 to 5. The fluid processing apparatus comprises a sample supply device 62, a proportioning pump 64, the previously described continuous filter apparatus 10, a colorimeter 68 of the flow cuvette type, and a recorder 70 operable under the control of the colorimeter. As indicated above, individual samples may be continually supplied in succession for filtering in the filter apparatus 10. As here shown, the samples are transmitted by pump 64 through pump tube 72 from the supply device 62, via conduit 74. Concurrently with the pumping of the stream of sample, air or other inert fluid is supplied to pump tube 76 and a suitable processing liquid is supplied to pump tube 78. As explained in my U.S. Patent No. 2,797,149, the introduction of air in pump tube 76 divides each sample into a series of spaced segments separated from each other by intervening segments of air. The introduction of air or other inert gas into the tubes or passages through which the sample flows provides a self-cleansing action of said passages. In addition, due to the intermittent operation of the sample feed device 62, as will be explained more fully hereinafter, successive samples are separated from each other by an intervening segment of air and by an intervening segment of processing liquid which may function as a wash liquid between the samples, as previously mentioned.

The flowing streams of fluid, air and processing liquid join each other at fitting 80 and are transmitted by the action of the pump to helical mixing coil 82, via conduit 84. In the mixing coil, the segments containing the sample fluid and the processing liquid are mixed together and are transmitted to the continuous filter apparatus 10, via tube 38, for the continuous filtering operation, as previously described.

In the case of cholesterol determinations in blood serum, pump tube 78 will be supplied with a solution of isopropyl alcohol so that during the passage of the sample stream through mixing coil 82, the proteinous material in the sample will be precipitated. This precipitate is held back by the filter cups 14 of the filter apparatus and the filtrate containing the cholesterol free of the proteinous material is collected in trough 54. The filtrate is aspirated by the action of the pump from trough 54, through outlet 56 thereof, via conduit 90 and pump tube 92. Air is supplied to pump tube 94 and a suitable color reagent is supplied to pump tube 96. The stream of filtrate, air and color reagent join at fitting 98 to form a segmented stream consisting of liquid segments containing filtrate and color reagent separated by intervening segments of air or other inert fluid. The segmented stream is transmitted by the action of the pump to helical mixing coil 100 via conduit 102. In the present example the color density will be indicative of the quantity of the cholesteral in the samples of blood serum. From the mixing coil the segmented colored stream is transmitted to the flow cuvette (not shown) of the colorimeter 68, via conduit 104, wherein the color density or light absorption of the stream is measured and recorded on the recorder 70 which is operated under the control of the colorimeter. The stream is discharged from the flow cuvette of the colorimeter through outlet 106. In this manner samples in the form of a flowing stream may be continuously treated and filtered for analysis and a continuous recording may be made indicating the quantity of a particular consistent of the sample. It will be understood that the apparatus may be used for the treatment of many fluids with respect to an ingredient thereof and the choice of the processing liquids and color reagents will depend upon the fluid being analyzed. It will be understood that the present invention is independent of any specific method of chemical analysis or treatment, but on the contrary may be employed in performing any method which necessarily or advantageously makes use of a filter for removing or extracting a particular substance or material from another.

The sample supply device 62 is preferably of a type shown and described in the application of Jack Isreeli, Serial No. 666,403 filed June 18, 1957, now U.S. Patent 3,038,340, and assigned to the assignee of the present application. Device 62 comprises a rotary plate 108 provided with a plurality of laterally spaced sample cups 110 arranged in a circle. The plate is rotated intermittently about its vertical axis by a Geneva gear mechanism (not shown), and a pick-up tube indicated at 112 is connected to pump tube 72, via conduit 74, and is pivoted at 114 for pivotal movement into and out of cups 110 while the rotary plate is stationary. When the pick-up tube is retracted from the cups, air is aspirated therethrough and through pump tube 72 by the action of proportioning or metering pump 64 whereby the successive samples of liquid are separated from each other by intervening air segments. In addition, when the pick-up tube is retracted from the cups air and processing liquid are being continuously supplied through pump tubes 76 and 78, respectively, because pump 64 is operating continuously. Accordingly, successive samples from the sample cups are separated from each other not only by said intervening segments of air but by segments of the processing liquid as well, as indicated previously. This separation of successive samples is maintained in the filter apparatus 10 in the manner previously indicated by adjusting the rate of longitudinal movement of sprocket chain 42 to assure that portions of each sample are collected in a series of filter cups and each intervening segment of processing liquid is collected in its own series of intervening filter cups. It will be apparent that as the sample liquid and the processing liquid leave the outlet of conduit 38, the air segments are vented to the atmosphere.

Pump 64 is preferably of the type shown and described in U.S. Patent No. 2,893,324 owned by the assignee of the present application. In such pump, the pump tubes are resiliently flexible and are compressed progressively along their lengths by rollers which are moved in engagement with the tubes longitudinally thereof. The relative quantities of fluids pumped through said tubes depend upon the internal diameters of the respective tubes, the rollers being operated at the same linear speed longitudinally of the tubes.

As indicated previously, colorimeter 68 is of the continuous flow cuvette type and the recorder is operated under the control of the colorimeter in a well known manner. Since both the colorimeter and the recorder are well known devices and do not per se form part of the invention, further description of these devices is unnecessary.

Referring now to FIGS. 6 through 9, there is shown another embodiment of the filter apparatus which is designated by the reference numeral 10' and is of the vacuum type rather than the gravity-feed type previously described. The filter apparatus comprises a continuous strip or web 12' of filter paper or other suitable filter material. The filter web is supplied from a supply roll 128 and is moved in the direction of its length by suitable means, herein shown as a pair of feed rollers 130, driven by suitable means not shown. The rollers withdraw the web of filter paper from the supply roll 128 and move it below and past liquid supply tube 38. The previously mentioned liquid outlet 39 is also preferably provided for pre-wetting the filter web, as previously described. If desired, the bottom of supply roll 128 may be placed in a receptacle containing a suitable wetting liquid for the pre-wetting operation in lieu of the pre-wetting liquid stream from outlet 39.

The filter web 12' is continuously drawn over the upper surface 132 of a vacuum filter bed 134 and is in sliding contact with said upper surface. A hold-down roller 135 is in rolling contact with the upper surface of the filter web 12' to help maintain the web in sliding contact with the upper surface of the filter bed. The filter bed is made from a rectangular block of a suitable material, for example a transparent plastic material, and has a series of horizontally spaced rows 136 of vertical holes 138, each of the holes in each row being horizontally spaced from each other transversely of the direction of movement of the filter web. The holes 138 in each row are connected to a horizontal passage 140, each passage providing a manifold for the holes in the respective row. Each of the passages 140 is connected to a passage 142 which extends longitudinally of the filter bed 134 in the same direction as the direction of movement of the filter web 12'. The outlet end 56' of passageway 142 is connected to the previously mentioned conduit 90, so that operation of proportioning pump 64 produces a vacuum in passageway 142, pulling filtrate through the web, into the filter bed 134, via holes 138. The filtrate is aspirated from the filter bed via manifolds 140, passageway 142, conduit 90 and pump tube 92.

A vertical member 146 supports the filter bed 134 and for this purpose one end of the filter bed is provided with a horizontal hole 148, provided with a bushing 149, through which a supporting arm 150 extends, said supporting arm being connected to member 146 and being secured to said filter bed by a nut 152. The hold-down roller 135 may be connected to support 146.

From the foregoing it is seen that filter web 12' is withdrawn from supply roll 128 and moves continuously past liquid supply outlet 38 so that succeeding unused portions of the web of filter material are continuously disposed below said outlet 38 to receive liquid for the filtering operation. In this manner, a fresh filtering surface is continuously being presented at the liquid supply station to receive liquid for filtering. The filtrate is pulled through the filter web under the influence of the vacuum and the precipitate or other material not passing through the filter web is carried away on the moving web. The used filter material may be disposed of or cleaned for reuse or otherwise, as desired, or as required.

It will be apparent that the apparatus shown in FIGS. 6 through 9 may be used for continuously filtering a succession of individual samples in a flowing stream or may be used for continuously filtering a liquid in the form of a continuous stream for monitoring or analysis in respect to a continuous process or system for production, treatment or other operation which requires continuous filtering of a liquid stream.

It will be understood that it is within the scope of the present invention to treat or analyze the precipitate or solid material remaining in the cups 14 or on the strip of filter material 12' in respect to the particular ingredient in the liquid specimen stream and this analysis of the precipitate or other matter may be done in addition to the analysis of the filtrate or in lieu thereof, as desired or as may be required.

While I have shown and described the preferred embodiments of my invention it will be understood that various changes may be made in the present invention without departing from the underlying idea or principles of the invention within the scope of the appended claims.

What is claimed is:

1. Apparatus for processing a liquid for analysis in respect to an ingredient thereof, comprising a liquid supply station, means to transmit a stream of said liquid to said supply station, means including a filter having successive fresh portions only movable past said supply station to receive and filter said stream of liquid, means for receiving the filtered liquid from said successive fresh portions of the movable filter and for transmitting a stream of the filtered liquid to a predetermined point concurrently with the transmission of the first mentioned stream of liquid to said supply station, means for treating said stream of filtered liquid, during the flow thereof, for colorimetric examination in respect to said ingredient while said first mentioned stream of liquid is being transmitted to said supply station for the filtering operation.

2. Apparatus for processing a liquid with respect to an ingredient thereof, comprising a liquid supply station for supplying a stream of said liquid, means mounting a strip of filter material for movement in the direction of its length past said liquid supply station for receiving liquid therefrom, means for moving said strip of filter material in said direction to and from said liquid supply station to position successive fresh portions of said strip of filter material at said liquid supply station to receive said liquid for the filtering operation, stationary filtrate receiving means having an upper surface engaging the under surfaces of said filter strip portions and provided with an inlet for the filtrate from said successive portions of the strip of filter material, means for applying a suction to said filtrate receiving means to pull said filtrate through said successive fresh portions of said strip of filter material and into said filtrate receiving means through said inlet thereof, conduit means for the flow of filtrate from said receiving means, and means for introducing a reagent into said conduit means during the flow of the filtrate therein for treating said filtrate for analysis in respect to said ingredient concurrently with the movement of successive portions of said strip of filter material toward and away from said liquid supply station and concurrently with the flow of said filtrate into said receiving means.

3. Apparatus for processing a liquid with respect to an ingredient thereof, comprising a liquid supply station for supplying a stream of said liquid, means mounting a strip of filter material for movement in the direction of its length past said liquid supply station for receiving liquid therefrom, means for moving said strip of filter material in said direction to and from said liquid supply station to position successive portions of said strip of filter material at said liquid supply station to receive said liquid for the filtering operation, stationary filtrate receiving means having an upper surface, means holding said strip of filter material in sliding contact with said upper surface of said stationary filtrate receiving means, conduit means connected to said filtrate receiving means for transmitting a suction thereto to pull the filtrate through said filter material and into said conduit means, and means for introducing a reagent into said conduit means during the flow of the filtrate therein for treating said filtrate for analysis in respect to said ingredient concurrently with the movement of successive portions of said strip of filter material toward and away from said liquid supply station and concurrently with the flow of filtrate into said receiving means.

4. Apparatus for processing a liquid to determine the quantity of an ingredient thereof, comprising a liquid supply station for supplying a stream of said liquid, means mounting a strip of filter material for movement in the direction of its length past said liquid supply station for receiving liquid therefrom, means for moving said strip of filter material in said direction to and from said liquid supply station to position successive fresh portions of said strip of filter material at said liquid supply station to receive said liquid for the filtering operation, stationary filtrate receiving means having an upper surface which is engaged by the undersurface of said filter strip material and which has an inlet for the filtrate from said strip of filter material, conduit means connected to said receiving means for transmitting filtrate therefrom, means in fluid flow communication with said conduit means for treating said filtrate for analysis in respect to said ingredient concurrently with the movement of successive portions of said strip of filter material toward and away from said liquid supply station and concurrently with the flow of filtrate into said receiving means, and analyzing means in fluid flow communication with said last mentioned means for analyzing said treated filtrate to thereby determine the quantity of said ingredient in said first mentioned liquid.

5. Apparatus for processing a liquid to determine the quantity of an ingredient thereof, comprising a liquid supply station for supplying a stream of said liquid, means mounting a strip of filter material for movement from a supply roll thereof in the direction of its length past said liquid supply station for receiving liquid therefrom, means for moving said strip of filter material in said direction to and from said liquid supply station to position successive portions of said strip of filter material at said liquid supply station to receive said liquid for the filtering operation, filtrate receiving means having an inlet for the filtrate from said strip of filter material, conduit means connected to said receiving means for transmitting filtrate therefrom, means in fluid flow communication with said conduit means for treating said filtrate during its flow of analysis in respect to said ingredient concurrently with the movement of successive portions of said strip of filter material toward and away from said liquid supply station and concurrently with the flow of filtrate into said receiving means, and a continuous flow colorimeter connected to said last mentioned means for receiving the treated filtrate for said analysis thereof.

6. In a filtering apparatus having a liquid supply station for supplying liquid to be filtered, means mounting a plurality of normally collapsed filter elements disposed in side-by-side relationship for movement past said liquid supply station, said filter elements being expandable from their collapsed condition to an open condition to provide a plurality of open top filter elements for receiving said liquid, means for moving said plurality of filter elements to and from said liquid supply station to position each of said filter elements successively at said liquid supply station to receive said liquid for the filtering operation, and means for expanding said filter elements into their open condition before they arrive at said liquid supply station.

7. In a filtering apparatus having a liquid supply station for supplying liquid to be filtered, means mounting a plurality of normally collapsed filter elements disposed in side-by-side relationship for movement past said liquid supply station, said filter elements being expandable from their collapsed condition to an open condition to provide a plurality of open top filter elements for receiving said liquid, and means for moving said plurality of filter elements to and from said liquid supply station to position each of said filter elements successively at said liquid supply station to receive said liquid for the filtering operation, said moving means comprising an endless conveyor disposed laterally of said filter elements and having longitudinally spaced members engageable with said filter elements for expanding said elements into their open condition before they arrive at said liquid supply station.

8. In a filtering apparatus having a liquid supply station for supplying liquid to be filtered; a hopper, a strip of filter material folded into a plurality of open top filter elements disposed in side-by-side relationship, said filter elements being expandable and collapsible into open and closed positions, respectively, and being disposed in said hopper in collapsed condition, and means for moving said plurality of filter elements from said hopper to and from said liquid supply station to position each of said filter elements successively at said liquid supply station to receive said liquid for the filtering operation, said moving means including means for expanding each of said filter elements into their open position during their egress from said hopper.

9. Apparatus for processing a liquid with respect to an ingredient thereof, comprising means for forming a stream containing spaced segments of said liquid separated from each other by intervening segments of another liquid, a liquid supply station, means for transmitting said segmented stream to said liquid supply station, means mounting a plurality of open top filter receptacles disposed in side-by-side relation for movement past said liquid supply station for receiving liquid therefrom, and means for moving said plurality of filter receptacles to and from said liquid supply station at a speed in relation to the rate of flow of said segmented stream to position a series of said filter receptacles at said station to receive portions of said liquid from a segment of said stream and to position a succeeding series of filter receptacles at said station to receive portions of said other liquid from an intervening segment of said stream.

(References on following page)

References Cited in the file of this patent

UNITED STATES PATENTS

| | | |
|---|---|---|
| 2,201,628 | McCormick et al. | May 21, 1940 |
| 2,377,252 | Lehreche | May 29, 1945 |
| 2,457,958 | Walker | Jan. 4, 1949 |
| 2,568,420 | Thornson | Sept. 18, 1951 |
| 2,665,812 | Crane | Jan. 12, 1954 |
| 2,731,108 | Kennedy | Jan. 17, 1956 |
| 2,734,377 | Traver | Feb. 14, 1956 |
| 2,797,149 | Skeggs | June 26, 1957 |
| 2,895,614 | Kornline | July 21, 1959 |
| 2,935,200 | Lutz et al. | May 3, 1960 |
| 2,963,161 | Holland | Dec. 6, 1960 |
| 3,046,869 | Reynolds | July 31, 1962 |

UNITED STATES PATENT OFFICE
CERTIFICATE OF CORRECTION

Patent No. 3,098,719

July 23, 1963

Leonard T. Skeggs

It is hereby certified that error appears in the above numbered patent requiring correction and that the said Letters Patent should read as corrected below.

Column 1, line 27, for "2,767,149" read -- 2,797,149 --.

Signed and sealed this 14th day of January 1964.

(SEAL)
Attest:
ERNEST W. SWIDER

Attesting Officer

EDWIN L. REYNOLDS

Acting Commissioner of Patents